United States Patent [19]

Tamura et al.

[11] Patent Number: 5,036,897

[45] Date of Patent: Aug. 6, 1991

[54] THERMAL PRINTING HEAD MANUFACTURING METHOD

[75] Inventors: Toshitaka Tamura, Kashihara; Hiroyuki Katayama, Fujiidera; Hiroshi Suzuki, Nara; Masato Kawanishi, Habikino, all of Japan

[73] Assignee: Ford Motor Company, Dearborn, Mich.

[21] Appl. No.: 567,063

[22] Filed: Aug. 14, 1990

[30] Foreign Application Priority Data

Aug. 17, 1989 [JP] Japan .............................. 1-213930

[51] Int. Cl.[5] .......................... B44C 1/22; C23F 1/02; C03C 15/00; B29C 37/00

[52] U.S. Cl. .................................... 156/630; 156/634; 156/648; 156/655; 156/656; 156/659.1; 156/668; 156/902; 219/216

[58] Field of Search ............... 156/648, 650, 655, 656, 156/659.1, 666, 668, 901, 902, 630, 634; 219/216

[56] References Cited

U.S. PATENT DOCUMENTS 4,614,563 9/1986 Kubo .............................. 156/668 X
4,617,088 10/1986 Nishiguchi et al. ................. 156/656
4,710,263 12/1987 Kato .................................. 156/630
4,786,357 11/1988 Campanelli et al. ............ 156/901 X
4,882,839 11/1989 Okada ............................ 156/902 X

*Primary Examiner*—William A. Powell
*Attorney, Agent, or Firm*—Allan J. Lippa; Peter Abolins

[57] ABSTRACT

A method of manufacturing a thermal printing head includes forming a layer of polyimide resin precursor on a heat-resistant resin substrate on which two parallel common electrodes and a large number of lead electrodes are formed beforehand in such a manner that the lead electrodes are separated from the common electrodes by a predetermined distance and are disposed on one side of the common electrodes in a vertical direction. It further includes performing a first etching on the layer of polyimide resin precursor such that a predetermined pattern is formed. Heat treatment is then performed on the layer of polyimide resin precursor to simultaneously form, between the lead electrodes and the common electrode disposed close to the lead electrodes, a polyimide resin heat accumulating layer as a base for a heating resistor as well as a polyimide resin insulating layer capable of electrically insulating a jumper wire connecting the common electrode disposed remote from the lead electrodes to the heating resistor on the common electrode disposed close to the lead electrodes. The heating resistor is then formed on the polyimide resin heat accumulating layer. Finally, a wire connecting the heating resistor to the two common electrodes and to the plurality of lead electrodes is formed.

4 Claims, 2 Drawing Sheets

THERMAL PRINTING HEAD MANUFACTURING METHOD

BACKGROUND OF THE INVENTION

1. Field of the Invention

The present invention relates to a method of manufacturing a thermal printing head for use in a thermal recording apparatus which may be a facsimile or a printer. More particularly, it relates to a method of forming a heat accumulating layer and an insulating layer for common electrodes.

2. Description of the Prior Art

In recent years, thermal printing heads have been widely used in various recording apparatuses such as facsimiles and printers for word processors. Requirements of these recording apparatuses are those of reduction in size and in production cost. There is, therefore, a demand for a small and inexpensive thermal printing head.

Conventional thermal printing heads are manufactured using a heat accumulating layer made of a glazed glass printed and burned on an alumina ceramic substrate whose purity is 90% or above. Manufacture of such a thermal printing head contains many processes, such as purification of alumina powder, polishing, printing and burning. Accordingly, cost thereof is high.

Recently, attention has been paid to an inexpensive thermal printing head in which a heating resistor and a circuit substrate for driver ICs are integrally formed on a heat-resistant resin substrate. This technique eliminates the alumina ceramic substrate and employs, in place of the glazed glass layer, a partially patterned polyimide resin layer, as a heat accumulating layer which controls emission and accumulation of heat.

Such thermal printing heads whose components are integrally formed on the heat-resistant resin substrate are manufactured in the manner described below. First, a flat heat-resistant resin substrate, which is cut to a predetermined dimensions, is washed. Then, a copper foil is laminated on the surface of the substrate by the heating/pressing method. This copper foil is then formed into a predetermined pattern by the photolithographic process to form one common electrode and a large number of lead electrodes in such a manner that they are separated from the common electrode by a predetermined interval and disposed in a vertical direction. Next, an electrode structure to be connected to the driver ICs by the flip chip bonding is formed by first coating nickel on the copper pattern and then gold, by the electrolytic plating. Thereafter, a polyimide heat accumulating layer is formed by coating predetermined thickness a varnish-like polyimide precursor on the substrate to a predetermined thickness by a roll coater, a spin coater or a screen printer, then by drying the coated polyimide precursor. Subsequently, etching is performed on the polyimide precursor to form a predetermined pattern and then curing the polyimide precursor is performed. Next, a heating resistor is formed by first forming on the polyimide heat accumulating layer, a layer of Ni—Cr, $Ta_2N$, Ta—Si—O type, Ti—Si—LO type or Ni—SiO type by sputtering and then by conducting etching, such that it has a predetermined pattern. Thereafter, a wire which connects the heating resistor to the common electrode and to the lead electrodes. Subsequently, a protective film is then formed by a sputtering or plasma CVD method. Subsequently, the driver ICs are connected by means of the flip chip bonding or the like, and the substrate is then cut into predetermined dimensions. Thereafter, the individual substrate is adhered to a heat-emitting substrate by means of a double coated tape or the like. Then, a thermistor, a capacitor, a connector and a head cover are mounted, thereby completing a thermal printing head. This thermal head, whose components are integrally formed on the heat-resistant resin substrate, exhibits excellent heat efficiency, achieves low production cost and is small in size and weight as compared with the conventional one which employs a glazed alumina substrate. These features of this thermal printing head coincide with those of a thermal printing head which has been desired in industrial fields and manufacture of this thermal printing head on an industrial basis has therefore been known.

However, in the case where the density of the thermal printing head is to be increased, the number of driver ICs increases in proportion to the number of bits of the heating resistor, thereby increasing the density of a wiring pattern. Consequently, manufacture of the thermal printing head requires higher accuracy. This increases production cost.

Accordingly, it has been proposed to provide two common electrodes and thereby decrease the number of driver ICs to one half and, hence, production cost.

However, a jumper wire which crosses (jumps) the common electrode disposed close to the lead electrodes and thus connects the common electrode disposed remote from the lead electrodes to the heating resistor, must be electrically insulated from the common electrode disposed close to the lead electrodes by means of an insulating layer. This makes the manufacturing process complicated.

SUMMARY OF THE INVENTION

The present invention is directed to eliminating the aforementioned problem of the prior technology. An object thereof is to provide a thermal printing head manufacturing method in which two common electrodes are formed on a heat-resistant resin substrate in order to achieve reduction in the number of ICs.

To this end, the present invention provides a method of manufacturing a thermal printing head comprising the steps of: forming a layer of polyimide resin precursor on a heat-resistant resin substrate on which two parallel common electrodes and a large number of lead electrodes have been formed in such a manner than the lead electrodes are separated from the common electrodes by a predetermined distance and are disposed on one side of the common electrodes in a vertical direction; performing a first etching on the layer of polyimide resin precursor to form a predetermined pattern and then performing heat treatment on the layer of polyimide resin precursor to simultaneously form, between the lead electrodes and the common electrode disposed close to the lead electrodes, a polyimide resin heat accumulating layer as a base for a heating resistor and a polyimide resin insulating layer capable of electrically insulating a jumper wire, connecting the common electrode disposed remote from the lead electrodes to the heating resistor on the common electrode disposed close to the lead electrodes; forming the heating resistor on the polyimide resin heat accumulating layer; and forming a wire, connecting the heating resistor to the two common electrodes and to a plurality of lead electrodes.

DESCRIPTION OF THE PREFERRED EMBODIMENT

Figure 1:
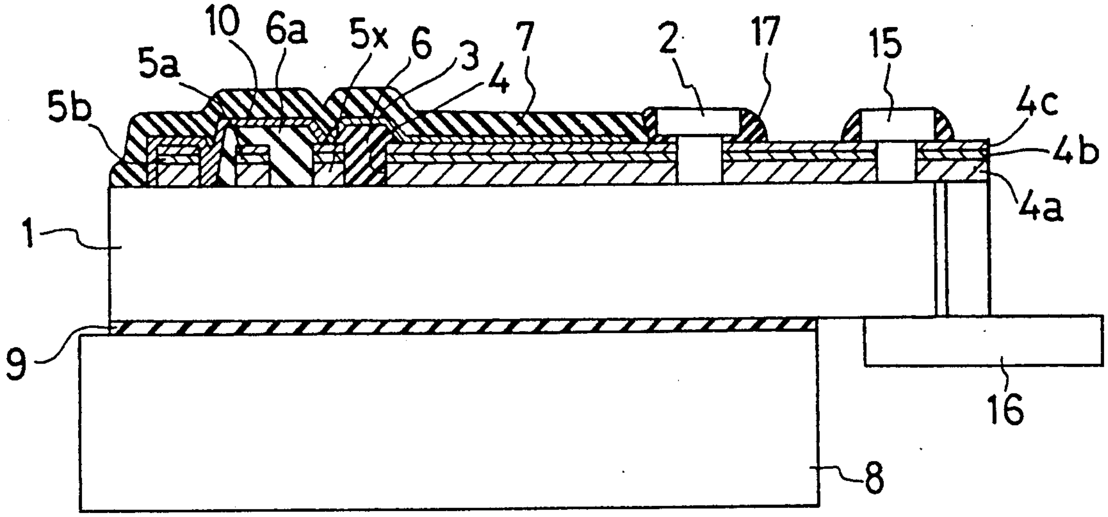
FIG. 1 is an explanatory view of a thermal printing head manufactured in an example of the present invention.

In this invention, a layer of polyimide resin precursor is formed on a heat-resistant resin substrate on which two parallel common electrodes and a plurality of lead electrodes have been formed beforehand in such a manner than the lead electrodes are separated from the common electrodes by a predetermined distance and are disposed on one side of the common electrodes in a vertical direction.

This heat-resistant resin substrate is a substrate on which various components of a thermal printing head, including part of driver ICs, lead electrodes, two common electrodes, a heat accumulating layer, an insulating layer, a heating resistor, a protective layer and so on, are to be formed. It may be made of a material which withstands continuous use at a temperature ranging from 300° to 400° C.

The heat-resistant resin substrate may be manufactured by forming a sheet of trifunctional epoxy resin or phenolic novolak, by forming the substrate into a predetermined configuration and then washing the individual substrate.

On this heat-resistant resin substrate are first formed two parallel common electrodes and a large number, plurality, of lead electrodes in such a manner that the lead electrodes are separated from the common electrodes by a predetermined distance and are disposed on one side of the common electrodes in a vertical direction. The common electrodes and the lead electrodes may be formed by laminating a copper foil to the surface of the heat-resistant resin substrate, by forming this copper foil into a predetermined pattern by a photolithographic process; and then by performing a first electrolytic nickel plating then performing gold plating on the copper pattern.

Next, a layer of varnish-like polyimide precursor is formed by coating the polyimide precursor on the substrate to a predetermined thickness using a roll coater, a spin coater or a screen printer and then by drying varnish-like polyimide precursor. The layer of the varnish like polyimide precursor may be formed by coating an organic solvent solution of aromatic polyamic acid. Aromatic polyamic acid may be a prepolymer obtained by heating a solution in which a stoichiometric amount of aromatic diacid anhydride and a stoichiometric amount of aromatic diamine component are dissolved in a solvent, such as N-methylpyrrolidone, dimethyl acetoamide or a mixture of these components.

In this invention, the layer of the polyimide precursor is subjected to first etching in a predetermined pattern and then a heat treatment to simultaneously form a polyimide resin heat accumulating layer and a polyimide resin insulating layer.

The polyimide resin heat accumulating layer has the function of cooling and accumulating the residual heat output by a heating resistor to a thermal printing head apparatus for a subsequent output. The polyimide resin heat accumulating layer may be formed between the lead electrodes and the common electrode disposed close to the lead electrodes as a base of a heating resistor connected to the lead electrodes and to the common electrode. The polyimide resin insulating layer has the function of providing electrical insulation for a jumper wire, connecting the common electrode disposed remote from the lead electrodes to the heating resistor, against the common electrode disposed close to the lead electrodes. The polyimide resin insulating layer may be formed on the common electrode disposed close to the lead electrodes, as the base of the jumper wire.

Both the polyimide resin heat accumulating layer and the polyimide resin insulating layer have a thickness of 3 to 60 μm, and more preferably, 3 to 30 μm.

Subsequently, the heating resistor is formed on the polyimide resin heat accumulating layer, and a wire connecting the heating resistor to the two common electrodes and to the large number of lead electrodes is then formed.

The heating resistor may be formed first by forming a layer of Ni—Cr, $Ta_2N$, Ta—Si—O type or Ti—SiO type on the polyimide resin heat accumulating layer by the sputtering or the like and then by conducting etching on this layer such that it has a predetermined pattern. The jumper wire may be formed first by forming a layer of Al, Al—Si, or Al—Cu on the polyimide resin insulating layer by sputtering or the like and then by conducting etching on this layer, such that a predetermined pattern is formed.

Next, a protective layer is formed by sputtering or a plasma CVD technique. Connection of driver ICs is then performed by the flip chip bonding or the like. Cutting of the substrate is then conducted. The individual substrate is adhered to a heat-emitting substrate by means of a double coated tape or the like, and components of the thermal printing head, such as a thermistor, a capacitor, a connector, and a head cover, are mounted on the individual substrate to complete a thermal printing head.

According to the present invention, the layer of polyimide resin precursor formed on the heat-resistant resin substrate, on which the two common electrodes and the lead electrodes are formed beforehand, is subjected to first etching such that it has a predetermined pattern. It is then subjected to heat treatment to simultaneously form the polyimide resin heat accumulating layer and the polyimide resin insulating layer.

EXAMPLE

An example of the present invention will now be described in detail.

Figure 3:
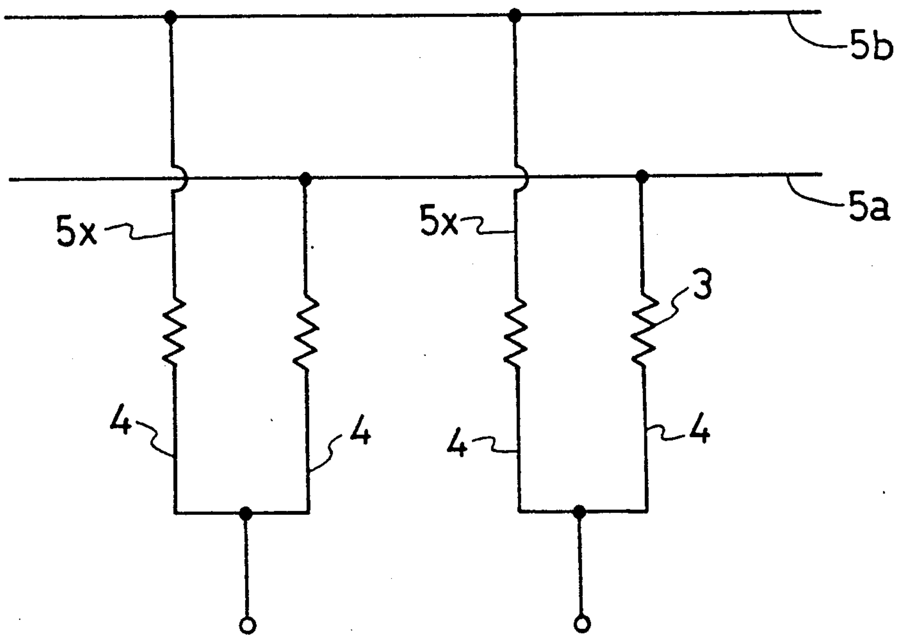
FIG. 3 shows an equivalent circuit which shows the connection of electrodes of a thermal printing head whose common electrode is divided into two portions.
Figure 2:
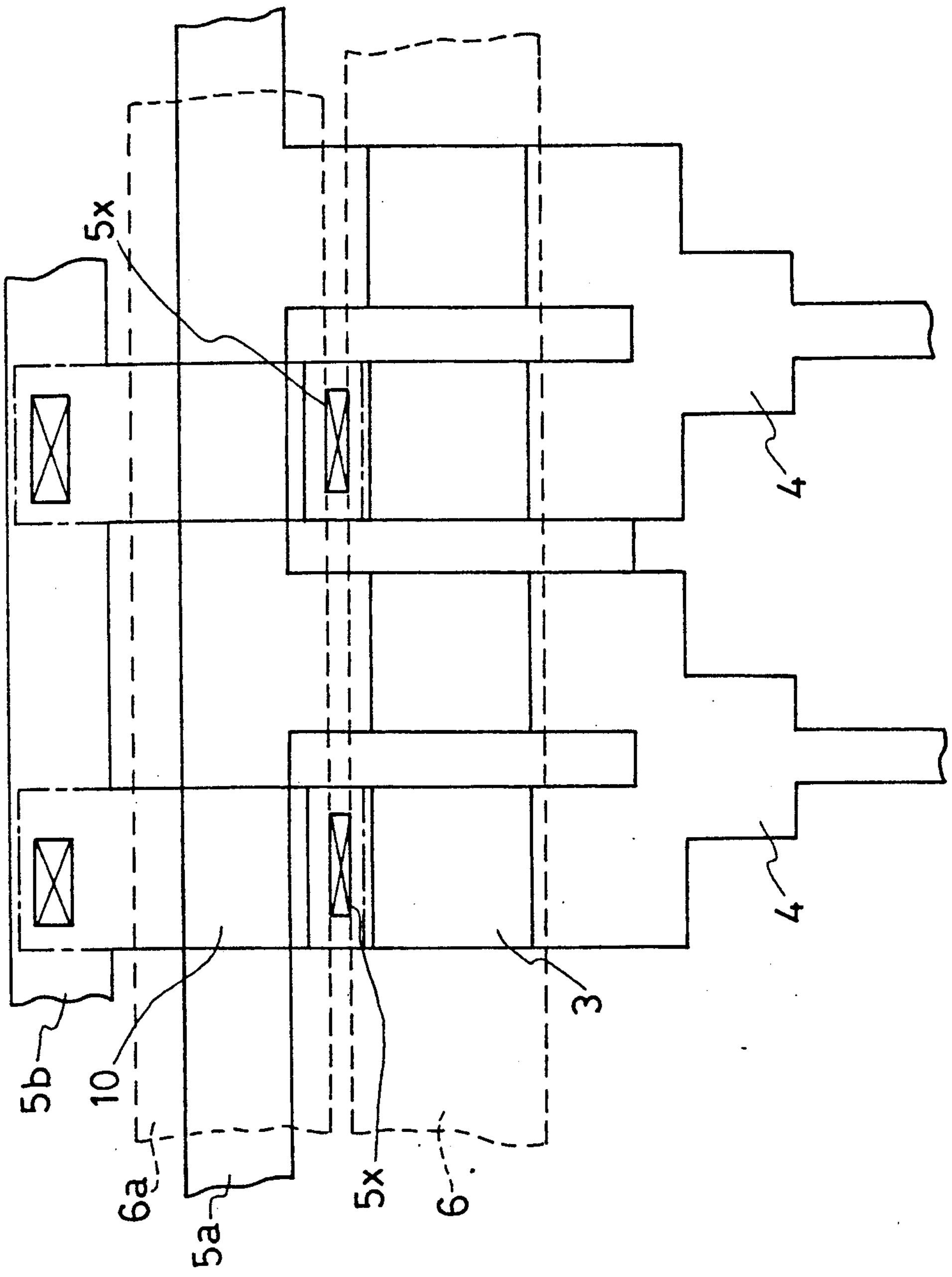
FIG. 2 is an explanatory view of a polyimide resin heat accumulating layer and a polyimide resin insulating layer of the thermal printing head of FIG. 1.

As shown in FIGS. 1 to 3, a copper foil layer 4a was formed on a heat-resistant resin substrate 1 having dimensions of 300 mm×300 mm×0.8 mm by first laminating copper foil having a thickness of 5 μm on the surface of the heat-resistant resin substrate 1 by a heating/pressing method and then by performing etching on the copper foil to form a predetermined pattern. Thereafter, an Ni layer 4b was first formed to a thickness of 1.0 μm and a gold layer 4c was then formed to a thickness of 0.1 μm on the copper foil layer 4a by the electrolytic plating to form lead electrodes 4, common electrodes 5a and 5b, and contact electrodes 5X for a jumper wire.

Next, a varnish-like polyimide resin precursor was prepared by dissolving Treneath #3000 (armomatic polyamic acid manufactured by Toray) in a solvent mixture which contained N-methylpyrrolidone and dimethyl acetoamide, and then stirring the mixture well at a temperature of 25°-30° C.

Thereafter, the obtained varnish-like polyimide resin precursor was coated on the substrate by a roll coater and then dried at a temperature of under 200° C. to form a layer of polyimide resin precursor. This layer of polyimide resin precursor was first etched such that it has a predetermined pattern, then heated for 60 minutes at a low temperature of about 200° C. at the beginning of the heat treatment, and then at a higher temperature which rose up to 300° C. to cure the precursor. This thereby simultaneously formed a polyimide resin heat accumulating layer 6 between the lead electrodes 4 and the common electrode 5*a* and a polyimide resin insulating layer 6*a*, capable of preventing electrical short-circuit of the portion of a jumper wire connecting the common electrode 5*b* to a heating resistor 3, which crosses the common electrode 5*a*.

Next, the heating resistor 3 made of Ta—Si—O type was formed on the polyimide resin heat accumulating layer 6 by sputtering. Thereafter, a common electrode jumper wire electrode 10 was formed by first forming an Al layer and then by conducting etching to form a predetermined pattern. Subsequently, a protective layer 7 was formed on the substrate except for the portions for a contact on which bumps for driver ICs were to be mounted and for the electrodes for a thermistor, a chip capacitor 15 and a connector 16. After a plurality of driver ICs were fabricated on the thus-obtained heating substrate by the flip chip bonding method, the IC portion was plastically sealed by the mold resin. Thereafter, the substrate was cut into a predetermined dimension. The individual substrate was attached to a heat-emitting plate 9 by means of a double coated tape 9, and the connector, thermistor, capacitor and so on were then mounted on the individual substrate by soldering. Thereafter, a head cover was mounted, and a thermal printing head was thereby completed.

According to the present invention, it is possible to manufacture thermal printing heads, each of which has on a heat-resistant resin substrate, two common electrodes so as to achieve reduction in the number of ICs, which exhibit excellent heat efficiency, and which is small in size and weight by the simply manufacturing process without requiring an expensive sputtering device at a low production cost.

What is claimed is:

1. A method of manufacturing a thermal print head, comprising the steps of:

forming a layer of polyimide resin precursor on a heat-resistant resin substrate on which two parallel common electrodes and a plurality of lead electrodes have been formed in such a manner that said plurality of lead electrodes are separated from said common electrodes by a predetermined distance and are disposed on one side of said common electrodes, in a vertical direction;

performing a first etching on said layer of polyimide resin precursor to form a predetermined pattern and then performing heat treatment on said layer of polyimide resin precursor to simultaneously form, between said plurality of lead electrodes, a polyimide resin heat accumulating layer as a base for a heating resistor and a polyimide resin insulating layer capable of electrically insulating a jumper wire, connecting one of said two parallel common electrodes disposed remote from said plurality of lead electrodes, to said heating resistor on one of said common electrodes, disposed close to said plurality of lead electrodes;

forming said heating resistor on said polyimide resin heat accumulating layer; and forming a wire, connecting said heating resistor to said two parallel common electrodes and to said plurality of lead electrodes.

2. The method of claim 1, wherein the layer of polyimide precursor is formed by coating an aromatic polyamic acid solution in an organic solvent.

3. The method of claim 1, wherein the polyimide resin heat accumulating layer and the polyimide resin insulating layer each has a thickness of 3-60 $\mu$m.

4. The method of claim 1, wherein the polyimide resin heat accumulating layer and the polyimide resin insulating layer each has a thickness of 3-30 $\mu$m.

* * * * *

UNITED STATES PATENT AND TRADEMARK OFFICE
CERTIFICATE OF CORRECTION

PATENT NO. : 5,036,897

DATED : August 6, 1991

INVENTOR(S) : Toshitaka Tamura et al

It is certified that error appears in the above-identified patent and that said Letters Patent is hereby corrected as shown below:

On the title page, item [73] Assignee, change "Ford Motor Company. Dearborn, Mich." to read as --Sharp Kabushiki Kaisha, Osaka, Japan--.

Before item [57] Abstract, "Attorney, Agent, or Firm—Allan J. Lippa; Peter Abolins" should be deleted.

Signed and Sealed this

First Day of June, 1993

*Attest:*

Michael K. Kirk

MICHAEL K. KIRK

*Attesting Officer*

*Acting Commissioner of Patents and Trademarks*